H. BECK.
THERMOSTAT.
APPLICATION FILED MAR. 29, 1917.
1,287,188.
Patented Dec. 10, 1918.
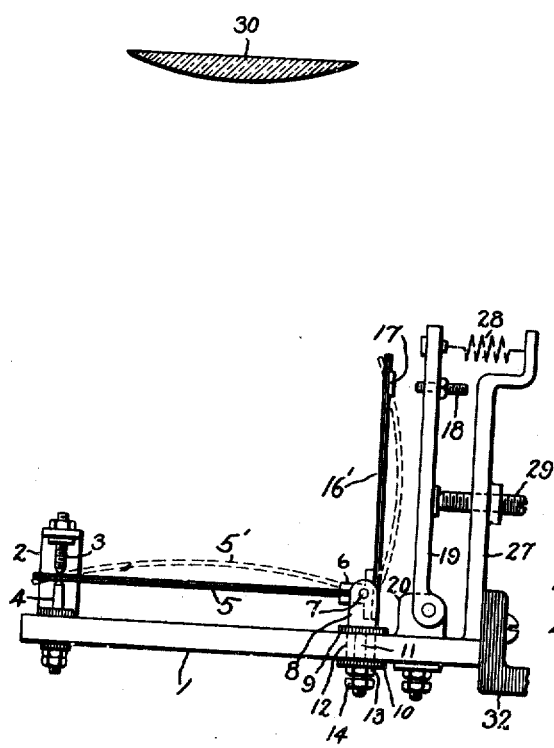
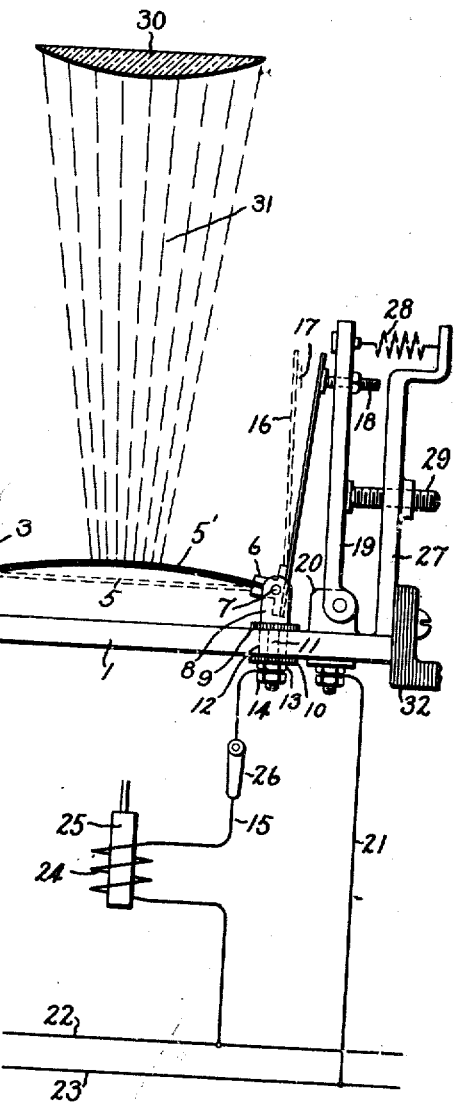
Inventor:
Heinrich Beck,
by Albert G. Davis
His Attorney.

UNITED STATES PATENT OFFICE.

HEINRICH BECK, OF SCHENECTADY, NEW YORK, ASSIGNOR TO GENERAL ELECTRIC COMPANY, A CORPORATION OF NEW YORK.

THERMOSTAT.

1,287,188.

Specification of Letters Patent.

Patented Dec. 10, 1918.

Application filed March 29, 1917. Serial No. 158,236.

*To all whom it may concern:*

Be it known that I, HEINRICH BECK, a subject of the Duke of Saxe-Meiningen, residing at Schenectady, in the county of Schenectady, State of New York, have invented certain new and useful Improvements in Thermostats, of which the following is a specification.

My invention has reference to improvements in thermostats, designed to control an electric circuit, especially by closing or opening the same when radiant heat is directed upon or is withdrawn from the instrument. In the circuit thus controlled is usually an apparatus energized by the current in the circuit when the latter is closed so as to perform some regulating or controlling function in a predetermined desired sense, and to perform a regulating or controlling function in the opposite sense when the circuit is opened.

In ordinary thermostats it has been found that the circuit controlling elements which should be affected solely by the access to or removal from the same of radiant heat, are also affected by variations of the temperature of the ambient air, so that the circuit is often closed or opened, as the case may be, by variations of the temperature of the surrounding medium. If this happens the apparatus in the circuit performs false and undesired regulating or controlling functions and means have heretofore been suggested designed to compensate for or to neutralize the tendency of a thermostat to respond effectively to variations of temperature of the surrounding medium; but in these old devices the compensation was generally uncertain and largely impaired the capability of the device to respond effectively to radiant heat, mainly for the reason that two movable contacts were employed, each moved separately by a thermostatic element in response to a rise or fall of the general temperature, and it was found difficult, if not impossible to make each contact equally responsive. In other compensating thermostats heretofore suggested, only one movable contact is employed, and the carrier of that contact, when it is a lever or arm designed to magnify the effect upon the contact of the movement of the thermostatic elements, is directly acted upon by both of these elements, the contact carrier itself being practically indifferent to variations of temperature. Such arrangements are complicated and are for this reason alone unreliable in their action. My improved thermostat is of the kind in which only one movable contact is used, the other being fixed, though adjustable, and of the two thermostatic elements which jointly control the single movable contact in response to a general variation of temperature, only one is subject to the action of radiant heat and acts directly upon the carrier and thereby indirectly upon the movable contact, while the carrier itself constitutes the other thermostatic element, and directly moves the contact. The particular construction which I employ also constitutes an improvement in non-compensating thermostats, when the carrier of the movable contact is made practically indifferent to variations of temperature. All this will more fully appear from the following detailed description, with reference to the accompanying drawing in which Figure 1 is a side elevation of my new form of thermostat, primarily designed to operate under the influence of radiant heat, but which also operates under variations of the external temperature; Fig. 2 shows a like view of my improved thermostat in which the tendency to operate under variations of external temperature is neutralized.

Referring now particularly to Fig. 1, there is a base plate 1, near one end of which is mounted a bracket 2, supporting the two pins 3—4 in vertical alinement, one or both of which are adjustable toward the other. Between these two pins projects the thermostatic strip or element 5, and is held between the pins by gentle friction. The thermostatic element extends parallel with the base plate to a bell crank 6, to which it is secured. The bell crank lever is pivoted at 7 in a support 8, mounted on the base plate and insulated therefrom. The insulation is indicated by the insulating washers 9—10, one on each face of the base plate, and by a screw threaded pin 11, surrounded by a sleeve of insulating material 12. The pin 11 and its insulating sleeve are indicated in dotted lines. The nut 13 clamps the support 8 to the base plate and between this nut and the nut 14 the leading-in wire 15 is secured. The pin 11, together with the two nuts 13—14, therefore, constitute a binding post. Of course any other form of binding post insulated from the base plate may be used.

The normal form and position of the thermostatic element 5 is shown in Fig. 1 by dotted lines.

To the bell crank 6 is secured a simple metal strip 16, which is practically unaffected by variations of temperature and which when the thermostatic element 5 is straight is at right angles thereto. At the upper free end of the strip 16 is a contact plate 17, opposite the contact pin 18, which is adjustably mounted in a rod 19, which is pivoted on a support 20 also mounted on the base plate, but not necessarily insulated therefrom. The support 20 terminates below the base plate in a binding post, substantially like that which receives leading-in wire 5. This second binding post receives the second leading-in wire 21, the two wires being here shown as a branch of the constant potential mains 22—23. One of these wires may include a solenoid winding 24, the core 25 of which will be suitably connected with any apparatus which the thermostat is designed to regulate or control. A switch 26 for opening the branch circuit may be placed in any one of the two branch wires; it is here shown in branch wire 15. A standard 27 rising from the right-hand end of the base plate is connected by an adjustable spring 28 with the pivoted rod 19, and the position of the latter and of the contact pin 18, with respect to the metal strip or contact carrier 16 can be adjusted by the screw 29 passing through the standard 27 and bearing upon the rod 19. In this manner the distance between the contact plate 17 and contact pin 18 can be adjusted accurately and fixed.

This apparatus is designed to be used in connection with a source of radiant heat, radiations from which may be concentrated upon the thermostatic element 5 by a condensing lens 30, or by some other optical arrangement. The heat rays from the lens toward the thermostatic element are indicated by the broken lines 31. The base plate is suitably insulated from the ground, as for instance by an insulating support 32.

When the thermostatic element is at normal room temperature it is straight, as shown in the drawing in dotted lines, and the pivot of the bell crank is in line with the element, the metal strip or contact carrier being substantially vertical; and in that case contact plate 17 is separated from the contact pin 18 and the circuit 15—21 is open. When, however, radiant heat strikes the thermostatic element and when the latter is suitably composed it curves upwardly, as shown at 5' in solid lines, and in that case the bell crank 6 is turned until the contact plate 17 on the carrier 16 presses upon the fixed contact pin 18, whereby the branch circuit 15—21 is closed and the solenoid reacts upon the apparatus which it is designed to regulate or control. When radiation from the source of heat to the thermostatic element is interrupted, this element cools rapidly and again assumes its normal straight form and the metal strip 16 again returns to its normal position and the branch circuit 15—21 is interrupted; the solenoid core then takes its original position and thereby again acts upon the apparatus which it regulates or controls but this time in the opposite sense from that in which it acted before, as will be readily understood. The particular form of thermostat here shown is very effective because a slight variation of temperature of the thermostatic element produces a considerable contact making or contact breaking movement, due to the fact that a slight curvature of this element results in a considerable angular displacement of the tangent to the curve at the point about which the bell crank lever 6 turns and the angular displacement of the strip or contact carrier 16 is equal to that of such tangent. The displacement of the contact carrier is not only large, but it also bears a definite relation to the curvature of the thermostatic element, so that the structure is a dead-beat thermostat. Owing to the fact that the curving element acts like a toggle lever upon the bell crank, the pressure of the movable contact upon the fixed contact is exceptionally firm, which is an important feature.

If the thermostatic element is composed of strips of such materials that the whole element curves upwardly, as shown in the drawing, when radiant heat impinges upon it and heats the same above normal room temperature, then it will, of course, curve downwardly if the temperature falls below the normal. The effect of this upon the thermostat shown in Fig. 1 will simply be to separate the contacts at 17—18, more than they are normally separated, but this will have no effect upon the branch circuit 15—21; but it is obvious that such lowering of the temperature of the thermostatic element might be utilized to close an electric circuit like that of the branch circuit 15—21, if pivoted rod 19 with its contact pin 18 is arranged on the left-hand side of the metal strip 16 instead of on the right-hand side, as shown in the drawing. These matters, however, are so readily understood by those skilled in the art that it is deemed unnecessary to illustrate such arrangement.

The thermostat so far described has the disadvantage that it will respond to variations of temperature of the surrounding air as well as to variations of temperature of the thermostatic strip due to radiant heat concentrated upon or withdrawn from it. Thus, when the temperature of the surrounding air for instance, rises, for any cause whatever, the thermostatic element will curve in the manner shown in the drawing and will close the branch circuit 15—21, and this will cause false or injurious regulating or controlling effects upon the apparatus connected to the solenoid core. This can in a manner be avoided by an attendant who observes the rise and fall of the temperature of the surrounding air and suitably turns the adjusting screw 29, whereby the normal distance between the contacts 17—18 can be approximately maintained through a wide range of variations of temperature. But this involves accurate observation and intelligent manipulation by the attendant.

Frequently, however, the thermostat is installed in locations where access to the same is difficult or where an attendant is not available or desired, and my automatic means for neutralizing the effect of spontaneous and unforeseen variations of the surrounding temperature make the apparatus independent of any attendant. This automatic means is shown in Fig. 2. The thermostat there shown is constructed substantially like that illustrated by Fig. 1, with this difference, however, that in place of the simple metal strip 16 which is practically indifferent to variations of temperature and which carries the contact 17, there is provided a second thermostatic element 16' which is under the influence of the same variations of the outside temperature as is the thermostatic element 5, but is outside the region of radiant heat. This second thermostatic element is composed of strips which, upon the rise of temperature bulge out laterally, as indicated in dotted lines. The effect of this arrangement is as follows: When ordinary room temperature persists, the two thermostatic elements 5—16' are straight, as shown in solid lines in Fig. 2. When the temperature of the surrounding air rises the element 5 curves upwardly, as indicated at 5' in dotted lines and tends to throw the element 16' to the right, so as to cause the movable contact to bear upon the contact pin 18 but at the same time the element 16' curves outwardly and tends to withdraw its contact plate 17 from the contact pin 18, and by proper choice of the length and of the materials of these thermostatic elements the two tendencies can be made to neutralize each other perfectly, so that the single movable contact 17 will remain stationary, the same as if the surrounding temperature were normal. The use of the adjusting screw 29 becomes under these conditions quite unnecessary for the compensation for variations of external temperature, but it is still useful for the original adjustment of the distance of the two contacts.

For the purpose of securing the automatic compensation for variations of the temperature of the surrounding air a great variety of thermostatic elements may be used. I have used with excellent results for the actuating thermostatic element 5, three strips of metal, superimposed and rolled out as one compound strip, namely, a strip of gold between two strips of silver and platinum, respectively, the silver strip on the side toward which it is designed that the element 5 curve upon the rise of temperature. I have used with excellent results the thicknesses of 4 mils of silver, 4 mils of platinum and 2 mils of gold; but these materials as well as the thickness of the same may be varied within wide limits. For the compensating thermostatic element 16', I have used two layers of metal, one being an alloy, known as invar, composed of 36% nickel, 63½% iron and ½% manganese; the other layer being ordinary brass. The brass layer in this case is on the side toward which the element is to curve when the temperature rises. The invar alloy is practically unaffected by wide variations of temperature, while the brass, of course, expands with the rise and contracts with the drop of temperature.

In this Fig. 2 I have also shown the condensing lens 30 in a position to direct radiant heat upon the thermostatic element 5. But the illustration of the heat rays is omitted in this figure of the drawing, because it is intended to show the behavior of the apparatus under the sole effect of the rise of temperature of the surrounding air. It will, however, be evident that when radiant heat is directed upon the thermostatic element 5, but not upon the element 16', the apparatus will work exactly like that shown in Fig. 1.

With the use of the materials above indicated and with the two thermostatic strips of about the relative lengths shown in the drawing I have found that the movable contact 17 remains stationary through a range of temperature from zero to 150 degrees F., a range that is far greater than is ordinarily experienced. By reason of the fact that one of the contacts is fixed and only one movable, the pressure contact produced by the use of either of the two forms of instruments illustrated in the drawing is firm and secure, without trembling and uncertainty.

It will be understood that the details of construction here specifically shown and described may be varied in many ways without departing from my invention.

What I claim as new and desire to secure by Letters Patent of the United States, is:

1. A thermostat for controlling an electric circuit, comprising a movable and a relatively fixed contact, a normally substantially straight thermostatic element constructed and mounted to curve between its ends under variations of temperature, a lever one arm of which extends in line with and is secured to one end of the element so as to move with the tangent to the curving element at the pivot of the lever, and a carrier for the movable contact secured to the other arm of the lever.

2. A circuit controlling thermostat, comprising one movable and one relatively fixed contact, a normally substantially straight thermostatic element constructed to curve between its ends under variations of temperature and exposed to the access of radiant heat and to the temperature of the surrounding medium, a lever, one arm of which is so connected with one end of the thermostatic element as to move with the tangent of the curving element at the pivot of the lever. and a thermostatic element exposed to the temperature of the medium constituting the carrier of the movable contact, connected to the other arm of the lever.

3. A circuit controlling thermostat, comprising one movable and one relatively fixed contact, a pivoted arm, constituting a thermostatic element exposed to the temperature of the surrounding medium carrying at its free end and moving the movable contact, and a second thermostatic element exposed to radiant heat and to the temperature of the medium, actuating the pivoted arm and thereby the contact in opposition to the action of the first thermostatic element.

4. A circuit controlling thermostat, comprising one movable and one relatively fixed contact, a pivoted thermostatic element exposed to the temperature of the medium carrying the movable contact, and a second thermostatic element exposed to radiant heat and to the temperature of the medium actuating the pivoted element.

In witness whereof, I have hereunto set my hand this 26th day of March, 1917.

HEINRICH BECK.